Figure 7:
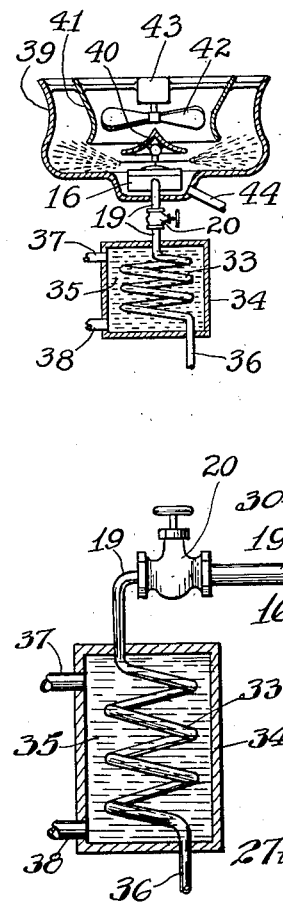

Dec. 27, 1932.  P. D. VAN VLIET  1,892,293
METHOD OF ATOMIZING LIQUIDS AND ABSORBING THE SAME BY GASES
Filed April 18, 1932  2 Sheets-Sheet 1
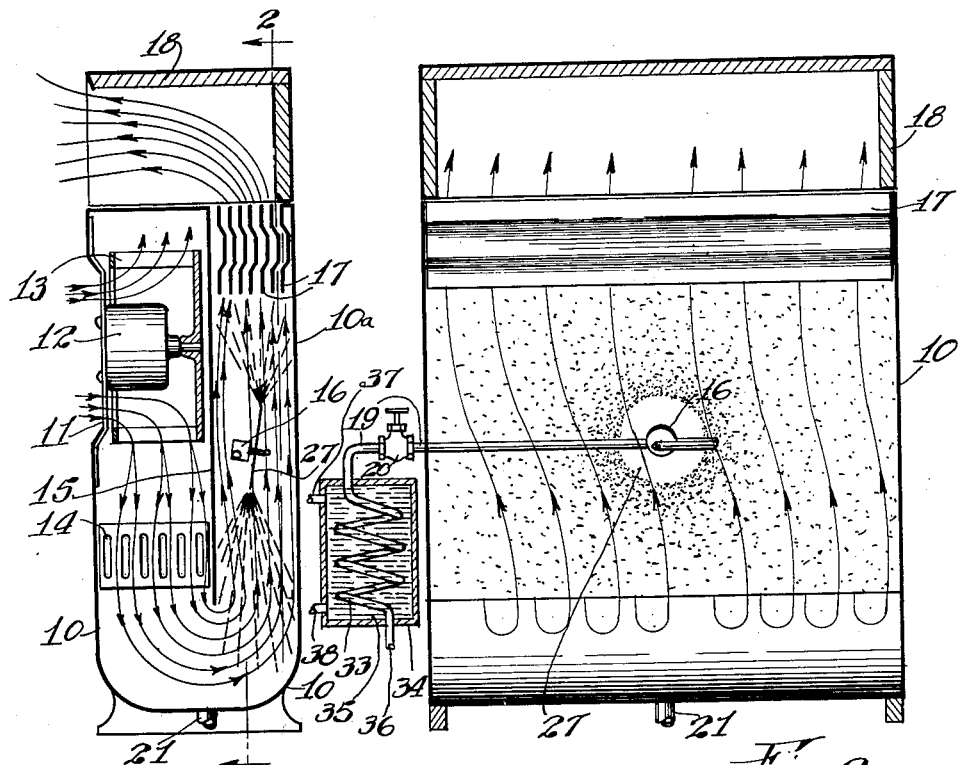
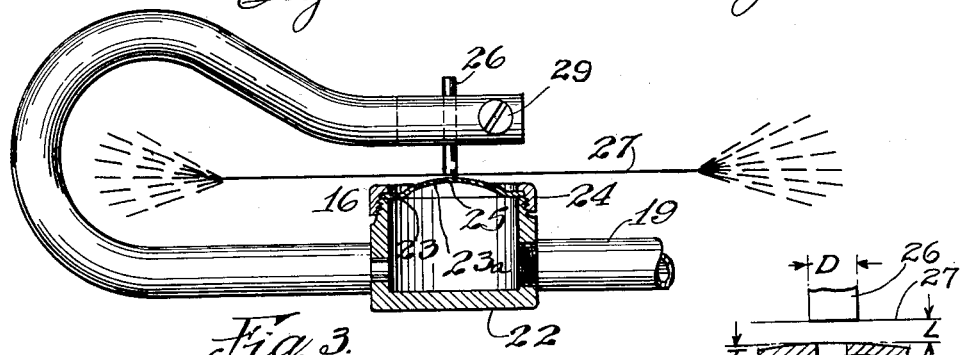
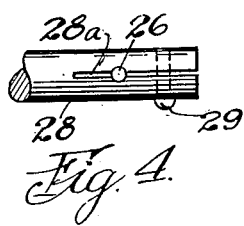
INVENTOR.
PAUL D. VAN VLIET.
BY Albert C. Bell
ATTORNEY.

Dec. 27, 1932.   P. D. VAN VLIET   1,892,293
METHOD OF ATOMIZING LIQUIDS AND ABSORBING THE SAME BY GASES
Filed April 18, 1932   2 Sheets-Sheet 2

INVENTOR.
PAUL D. VAN VLIET.
BY Albert C. Bell
ATTORNEY.

Patented Dec. 27, 1932

1,892,293

UNITED STATES PATENT OFFICE

PAUL D. VANVLIET, OF RIVER FOREST, ILLINOIS, ASSIGNOR TO AIR CONTROL SYSTEMS, INC., OF CHICAGO, ILLINOIS, A CORPORATION OF DELAWARE

METHOD OF ATOMIZING LIQUIDS AND ABSORBING THE SAME BY GASES

Application filed April 18, 1932. Serial No. 605,919.

My invention relates to an improved method of atomizing liquids and the impregnation thereby of gases flowing in passageways of restricted cross section, or otherwise having restricted or defined flow.

In many instances, where it is desired to impregnate a desired gas with liquid of one kind or another for purposes of heat transfer or of washing said gas, it is of importance to minutely sub-divide the liquid in the presence of the gas, so that the minute particles of the liquid may present a very large aggregate surface to the gas for purposes of interaction, for example particularly where the gas is flowing through a passageway of restricted cross section and has a limited time interval in which to effect the interaction. In such cases, producing a spray of relatively large particles of the liquid, is found to be ineffective and inefficient and in many cases objectionable.

By my invention, I first produce a thin and preferably circular film of the liquid to be atomized, the devices involved in doing this, being specially arranged so that the liquid film produced does not come in contact with any mechanical part involved. The liquid film is produced with sufficient velocity flow, so that when the surface tension of the liquid film is overcome by the flow velocity of the film and the attenuation of its outermost portion, the film breaks up uniformly around its periphery, into minute particles of the liquid which are so small as to form a mist of very large aggregate liquid surface in the surrounding gas, which mist, on account of the velocity remaining in its liquid particles, is projected outwardly in divergent directions from the entire periphery of the liquid film, but at relatively low velocity, so as to permeate the entire body of gas surrounding the liquid film, assuming that the passageway containing the gas and the liquid film, is of restricted cross section, which is the case illustrated in connection with my present showing.

By the method of my present invention, the gas which is to interact with the atomized liquid, is caused to flow by one means or another, and at a slow rate, so that although the passageway may be short, the minute condition of the atomized particles of the liquid and the large resultant liquid surface, and their extensive dispersion through the passageway, result in the effective interaction between the minute liquid particles and the gas.

By my method I preferably provide a particular relationship between the liquid film and the direction of flow of the gas or between the liquid film and the walls of the passageway, so that the plane of the liquid film extends generally in the direction of flow of the gas adjacent the film. Where a restricted passageway is used, the gas flowing through the passageway may be in intimate contact with the minute particles of atomized liquid for substantially the entire length of the passageway, the production of the liquid film is not interfered with by the flow of the gas, and the flow of the gas through the passageway is not modified appreciably by the liquid film. Furthermore, by this particular relation of the liquid film to the direction of flow of the gas through the passageway, the impinging of the atomized particles of the liquid upon the walls of the passageway, is reduced to a minimum, with attendant conservation of the liquid.

My method is applied below as an example of its use in connection with air conditioning mechanism of the console type. Such mechanism must necessarily be of such small size as to be conveniently used in the rooms of homes, where any apparatus for this purpose having large dimensions relatively to the room or rooms, would be out of the question. Such consoles are preferably not to exceed two and one-half to three feet in width, they are preferably of about the same height, and preferably not to exceed ten to eighteen inches from front to rear. Such air conditioning mechanism must provide means for moving the air through it, such as a motor and fan, also means for heating or cooling the air in its passage through the mechanism, and also means for conditioning the air before it is delivered from the mechanism. The presence of the other instrumentalities referred to in such mechanisms, necessarily narrows or restricts the spray compartment to but a part of the horizontal cross section of the mechanism as a whole, with the result that the spray compartment may be for example, but from three to nine inches of the depth of the mechanism from front to rear, and the length vertically of said humidifying compartment may be but from eighteen to twenty-four inches. Such mechanism must be provided with a water supply under suitable pressure for the water atomizing mechanism, and with a drain for removing surplus water from the mechanism.

With ordinary water spraying devices of the kind used for sprinkling lawns, the conditioning of the air in such air conditioning mechanism is out of the question, and cannot be effectively accomplished due to the limitations referred to in connection with the spray compartment.

In connection with the use of my method in air conditioning mechanism of the kind referred to, I find desirable results are secured by operating the atomizing devices at low pressures, for example ten to fifteen pounds per square inch. It will be understood that the pressures may be increased substantially above fifteen pounds per square inch with satisfactory results but with some increase in the sound of atomization. To effectively produce the water film and resulting atomized condition of the water under such pressures, I find it desirable to employ particular proportions of the parts of the film forming devices, as below described, so that the film formed by the devices will be thin and have sufficient velocity to break up into finely atomized condition.

Noise of any kind is an objection in connection with such air conditioning mechanism, and a certain amount of noise is always present in connection with projecting liquid with sufficient velocity to spray it or to atomize it. Where atomizing devices are employed with relatively high pressures, for example thirty-five to one hundred pounds per square inch or more, the breaking up of the water is attended with a high pitched hissing noise which is unpleasant and to be avoided. In carrying out my method, I proportion the film forming devices so that relatively low pressures may be used, with the result that the noise attending the atomizing of the liquid, is but a slight hiss of such low pitch and intensity that it is not objectionable when the mechanism is in use.

Another important consideration in connection with air conditioning mechanism, is that the atomized water shall as nearly as possible, completely fill the spray compartment of the mechanism, so that all parts of the air passing through the spray compartment, shall come into intimate contact with the atomized particles of water, to the end that maximum interaction between the liquid and the gas shall take place for purposes of heat transfer, and to the further end that the air shall be thoroughly washed of the soluble odors, dust and dirt it may carry when entering the air conditioning mechanism, thus not only delivering properly conditioned air from the mechanism but also air that is thoroughly cleaned. By my method, this result is effectively secured with the use of a relatively small quantity of water due to the very fine atomization and dispersion of the liquid, since the particular manner used by me, of forming the water film in the spray compartment, results in completely filling the spray compartment with water in the form of such minute water particles that they float in the air passing through the spray compartment, and come into intimate contact with all parts of the air flowing through the spray compartment.

It will be understood that my invention is applicable to many purposes besides the air conditioning referred to, and that it may be effectively used to impregnate to a greater or lesser degree, any desired gas with any desired liquid, either with or without vaporization of the liquid, or condensation of vapor from the gas.

Figure 6:
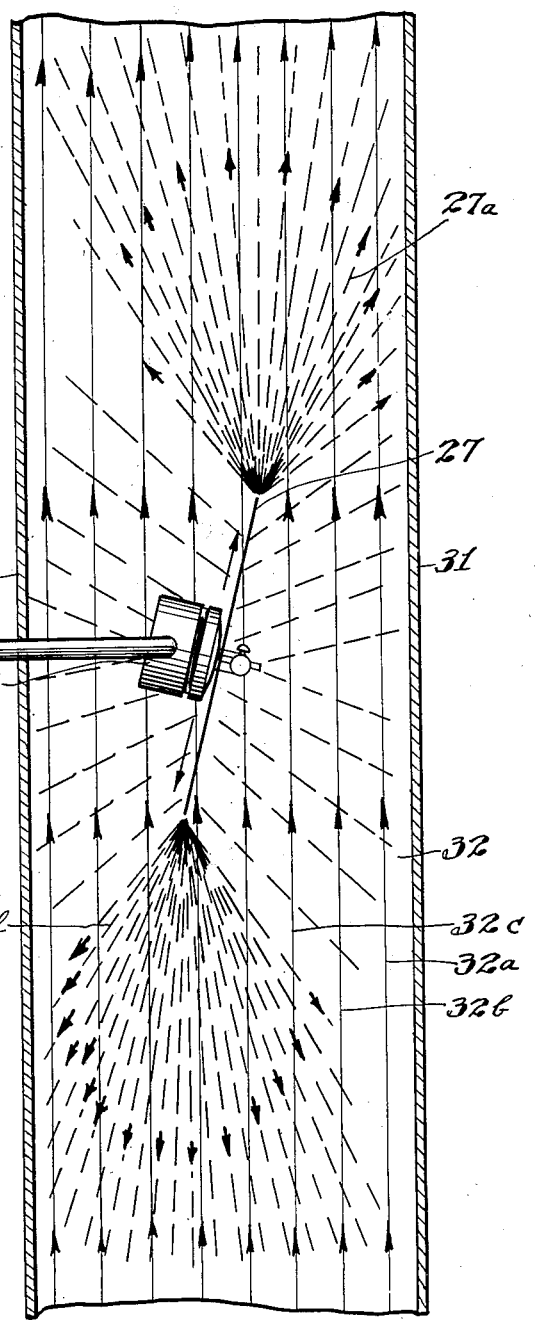

My invention will best be understood by reference to the accompanying drawings illustrating apparatus that may be conveniently used in carrying out my method, as follows:

Fig. 1 illustrates in vertical, sectional view, an air conditioning mechanism of the console type, in which film forming devices are located in the spray compartment, to condition the air in accordance with my invention, Fig. 2 is a vertical, sectional view of the parts shown in Fig. 1, taken along the line 2—2, Fig. 3 shows in side elevation, to an enlarged scale, the film forming devices preferably employed, Figure 4 is a plan view of a part of the structure shown in Fig. 3, immediately over the orifice or nozzle of the film forming devices, Fig. 5 is a diagrammatic view to an enlarged scale, showing the proportions and relation of the parts of a film forming device found desirable in carrying out my invention, Fig. 6 illustrates in a view similar to Fig. 1 and to an enlarged scale, the relation of gas flowing through a restricted passageway generically, to atomize liquid with which said gas is to be impregnated, and Fig. 7 illustrates a modified form of apparatus that may be employed to carry out my invention.

Similar numerals refer to similar parts throughout the several views.

As shown in Fig. 1, I illustrate at 10 the casing of an air conditioning mechanism, having an inlet opening at 11 back of which a motor 12 and fan 13 are disposed. The fan 13 is located in a front compartment of the casing 10 and projects the air downwardly in said compartment through a heat transfer mechanism 14 from which the air passes below the lower edge of a partition 15 and into the spray compartment between the partition 15 and the rear wall 10a of the casing. The air passes upwardly in the spray compartment due to the action of the fan 13, past the film forming devices 16, and from the upper portion of the spray compartment between plates 17 employed to remove surplus moisture from the air, from which the conditioned air is projected upwardly into the hood 18 of the mechanism, from which hood the conditioned air is directed horizontally through a discharge opening in its front wall. As shown in Fig. 2, the film forming devices 16 are located at substantially the mid portion of the spray compartment and are supplied with water under pressure through a pipe 19 controlled by a valve 20. The lower part of the casing 10 is provided with a drain pipe 21 for removing surplus moisture from the mechanism.

The film forming devices 16 are preferably constructed as shown in Figs. 3 and 4. As shown in these figures, the pipe 19 communicates with a receptacle 22 which is cylindrical in form and has an open end closed by a diaphragm 23 of thin metal, which is held in place on the end of the receptacle 22 by a threaded ring 24. The central portion of the diaphragm 23 is dished outwardly as indicated at 23a, so that its outer surface is somewhat outside of the outer end surface of the ring 24. The diaphragm 23 is provided with a central orifice or nozzle 25 which is in line with a round abutment or rod 26 having a squared end in the path of water flow through the orifice 25. The orifice 25 and the abutment or rod 26 are preferably proportioned and related as below described, to form a thin water film 27 which flows outwardly in all directions from the rod 26 so that said film is substantially circular in form where it breaks up into minutely atomized particles.

The rod 26 is supported in line with the orifice 25 by an arm 28 secured at one end to the receptacle 22 and extended outwardly and bent to surround a part of the film 27 without contact with said film, the upper end portion of the arm being substantially parallel with the extreme outer surface of the diaphragm 23. The upper end of the arm 28 is preferably cut longitudinally as shown at 28a in Fig. 4, and the rod 26 is disposed in a seat extending through the cut portion of the arm, in line with the orifice 25, so that it may be held at any desired distance from the said orifice by a clamping screw 29 extending through the end portion of the arm. Where the end of the rod 26 adjacent the diaphragm 23 is a plane surface substantially perpendicular to the axis of the rod and substantially parallel with the outer surface of the diaphragm 23, the water projected through the orifice 25 strikes the central portion of the end of the rod and continues to flow outwardly in all directions to produce the film 27, the size of the orifice 25 being determined by the pressure employed on the water in the receptacle 22 and the thickness and velocity of the film 27 desired.

In carrying out my invention I prefer to proportion the parts of the film forming devices so that the film 27 will be thin and of substantial diameter, for example from three to five inches, to the end that the velocity flow in the film may be sufficient to project the finely atomized water resulting from the breaking up of the film at its outer edge, to all parts of the spray compartment as illustrated in Fig. 2. The paths of flow of the air through the mechanism shown in Figs. 1 and 2 are illustrated by continuous lines carrying arrow-heads, the distribution of the air flowing through the spray compartment, being substantially uniform. It is to be noted that the plane of the film 27 in Fig. 1, is substantially in the direction of air flow through the spray compartment, the slight tilting of the film serving to effectively distribute the atomized water in the compartment. Bearing in mind that the distribution of atomized water from the film occurs uniformly around the entire film, it will be noted that the distribution of the atomized water in the spray compartment due to the direction of the plane of the film 27 indicated in Fig. 1, substantially fills the spray compartment with atomized water, the particles of water being so fine that they float freely to all parts of the compartment. This provides for the effective accomplishment of the steps of my method consisting of filling the passageway with atomized liquid, and moving the gas through the passageway so that all parts of it come into intimate association with the atomized liquid. The atomizing effect is in general best when the gas moves in parallelism with the film, but inclination of the film may be permitted provided the gas pressure against it does not become sufficient to distort it to a damaging extent.

On account of being continually in contact with atomized water in the spray compartment, the air flowing upwardly through the spray compartment may be effectively conditioned to any desired degree of humidity, notwithstanding that the vertical height of the spray compartment in which the conditioning action can take place, is small.

In Fig. 5 I illustrate to an enlarged scale, the proportions which may satisfactorily be employed for the rod 26, the orifice 25 and the separation of the rod 26 and the diaphragm 23. I find that for low pressure on the water, the diameter of the orifice or nozzle 25 may be from four to six hundredths of an inch, the thickness of the diaphragm 23 preferably being approximately the same as the orifice diameter, and in any event, I find that the diameter $d$ of the orifice may be at least as great or slightly greater than the length $T$ of the orifice; also that the distance $L$ between the discharge end of the orifice and the adjacent end of the rod 26, may be substantially equal to or slightly greater than the diameter $d$, and that the diameter $D$ of the rod 26 may be substantially fifty per cent greater than the diameter $d$. By adhering generally to these proportions, and to the low water pressures described, the high pitched hissing noise commonly present in connection with the use of atomizing devices involving high pressure is eliminated.

It is desirable that the receptacle 22 shall have a substantial diameter relatively to the diameter of the orifice 25, for example from at least eight to ten times the orifice diameter, although a larger inner diameter of the receptacle 22 is not objectionable. The length of the receptacle 22 axially should be great enough to insure symmetrical flow of the water in the receptacle to the orifice 25. The end of the rod 26 adjacent the orifice 25 may be a plane surface perpendicular to the axis of the rod, or it may be coned outwardly or inwardly, or it may be of convex curvature or of concave curvature as desired, as long as the departure from a plane surface does not interfere with forming the film 27, nor with the dispersion of the liquid particles in the spray compartment. With the end of the rod 26 of curved or conical formation, the film produced will depart from a plane surface and be convex or concave towards the rod 26, depending upon the direction in which the liquid leaves the periphery of the face of the rod, adjacent the orifice 25. I find that very effective results are produced by the film forming devices where the film forming end of the rod 26 is a smooth, plane surface perpendicular to the axis of the rod 26 and where the axis of the rod 26 is coincident with the axis of the orifice or nozzle 25, but I wish it understood that my method includes the employment of a cupped or non-plane film where the cupping of the film is insufficient to harmfully reduce the atomizing effect.

While I have described the film forming devices as used with water, to form a water film and subsequently to produce a finely atomized condition of water, it will be understood that said film forming devices are equally effective in producing a film from and a finely atomized condition of many other liquids, as may be desired.

In Fig. 6 I illustrate generically, film forming devices 16 disposed in a passageway 32 having walls 30 and 31 restricting the size of the passageway in one direction transversely of its length, the devices 16 being placed in the passageway similarly to the relation of the film forming devices in the spray compartment above described. Gas is caused to flow through the passageway 32 by any suitable means, along paths indicated by the lines 32a, 32b, 32c, and in the direction indicated by the arrow-heads on said lines. The liquid film 27 flows outwardly in all directions from the film forming devices at relatively high velocity, as indicated by the arrows adjacent the film, and the film breaks up into atomized liquid as illustrated at 27a, 27b, the small arrows in connection with the atomized liquid indicating the direction of projection and the velocity of the atomized liquid particles relatively to the velocity of liquid flow in the film. It will be noted that although the larger part of the velocity flow of the liquid in the film is dissipated by the breaking up of the film into the atomized particles, the particles still have sufficient velocity to project them in the diverging directions indicated, not only in the plane of the film, but also obliquely to the plane of the film and on both sides thereof, so that atomized particles of the liquid are projected to all parts of the passageway. Thus gas traveling through the passageway, passes through the atomized liquid below the film forming devices and also through the atomized liquid above the film forming devices. The low velocity of the atomized particles of liquid, produces no appreciable retarding effect on the gas flow through the passageway, and yet is sufficient to maintain the distribution of the atomized particles throughout the passageway, since the velocity of the gas flow through the passageway is preferably small.

In Fig. 1 I illustrate heat transfer mechanism 14 for action upon the gas, for example, air, it being understood that similar mechanism may be used for action upon the gas in Fig. 6, if desired, and in Figs. 2 and 6, I illustrate diagrammatically, heat transfer mechanism for action upon the liquid. As shown in Figs. 2 and 6, the pipe 19 extends from the valve 20 to a coil 33 in a tank 34 containing a heat transferring medium 35, the coil 33 being supplied with the liquid by a pipe 36 from any suitable source not shown. Where the medium 35 is a fluid, it may be delivered to and from the tank 34 by pipes 37 and 38 extending to any suitable source not shown. Where it is desired to extract heat from the gas or from the liquid, or both, before effecting interaction between the gas and the atomized liquid, the heat transferring medium supplied to the mechanism 14 or to the tank 34, or both as the case may be, is given a lower temperature than the temperature of the gas supplied to the mechanism 14, or of the liquid supplied to the coil 33, or both, and where on the other hand, it is desired to supply heat to the gas or to the liquid, or both, before effecting said interaction, the heat transferring medium supplied to the mechanism 14 or to the tank 34, or both as the case may be, is given a higher temperature than the temperature of the gas supplied to the mechanism 14, or of the liquid supplied to the coil 33, or both, it being understood that any desired heat transfer, or no heat transfer, may be effected by the mechanism 14 in any particular case, and that at the same time any desired heat transfer whether similar in kind or degree to that then being effected by the mechanism 14 or not, or no heat transfer, may be effected by the coil 33. The heat transferring mechanisms described are illustrative only, and it will be understood that I may employ any devices known to the art for effecting such heat transfer.

In Fig. 7, I illustrate a modified form of mechanism for treating gas with atomized liquid, by which a relatively large amount of the gas, for example the air in a room, may be treated or conditioned as desired and circulated by simple means. As shown in Fig. 7, I provide a bowl 39 containing in its lower central portion, film forming devices 16 below a baffle 40 of conical formation. Within the bowl 39 and above the baffle 40, and preferably concentric with the bowl, a sleeve 41 is disposed to direct the gas into and from the bowl. While the transverse area of the passageway between the sleeve and the bowl may have any desired relation to the transverse internal area of the sleeve, I prefer that said passageway area shall be less than said sleeve area.

A fan 42, driven by a motor 43, is mounted in or adjacent to the sleeve 41, to cause the gas to flow through said sleeve. The bowl is provided with a drain pipe 44, and the film forming devices 16 may be supplied with liquid in the manner above described in connection with Figs. 2 and 6.

With the structure illustrated in Fig. 7, gas may be treated with desired liquid, the fan causing movement of the gas through the sleeve and around its lower end and through the passageway between the sleeve and the bowl, the direction of said gas movement being determined by the direction of rotation of the fan. The gas in its movement around the lower end of the sleeve is caused to flow through the finely atomized liquid and is thus effectively treated by the liquid. I thus provide a means for effecting circulation in a body of gas which may be large relatively to the mechanism employed to treat the gas, which will effectively treat the entire body of gas with desired liquid, for example, the air in a room may be treated and conditioned as desired.

Although I have herein described my method as applied to the saturation or impregnation of a gas with a liquid, as in conditioning air, I wish it understood that my method is equally applicable to the impregnation or mixture of a gas with a liquid for other purposes, both with and without vaporization or condensation of the liquid.

While I have illustrated my invention as carried out by the particular structure above described, it will be understood that I do not limit myself to said means, or to the specific steps of treatment described, as I may employ equivalent structures known to the art at the time of the filing of this application, and equivalent steps of treatment that will effect the results described, without departing from the scope of the appended claims. I wish my description and drawings to be taken in a broad sense as illustrating rather than limiting me to my present description and showing.

In particular it will be understood that when in the specification and claims I use the term "parallel" or "parallelism" in connection with the relationship between the film and the gas being treated, I mean to include more or less curvilinear movement as well as rectilinear movement, as in the case where the film may be somewhat dished or cupped and the air or gas being treated moves in general conformity to the surface of the film.

What I claim is:

1. The method of mixing a liquid and a gas which consists in causing the formation of a relatively thin, continuous film of liquid wherein the liquid travels outwardly along radial lines from a center of dispersion causing the continuous discharge from substantially the entire edge of such film of separated and finely divided liquid particles, the film being substantially unbroken and unsupported, and exposing the film and the particles to contact with a current of gas traveling in general parallelism with and on both sides of the plane of the film.

2. The method of mixing a liquid and a gas which consists in causing the formation of a relatively thin continuous unsupported film of liquid, wherein the liquid travels outwardly along radial lines from a center of dispersion causing the continuous discharge from substantially the entire edge of such film of separated and finely divided liquid particles, and subjecting the gas to said particles in the course of their free and unobstructed travel outwardly from the edge of the film.

3. The method of mixing liquid and gas which consists in forming a relatively thin, continuous film of liquid wherein the liquid travels outwardly along radial lines from a common center, causing the formation about the edge of such film of a continuous supply of separated liquid particles, the film being unbroken and unsupported, and exposing the film on both sides to contact with a current of gas traveling along lines generally parallel to the plane of the film.

4. The method of mixing liquid and gas which consists in discharging a stream of liquid into an atomizing zone, there suddenly changing the direction of flow of the liquid through an angle of approximately 90 degrees and thereby discharging the liquid in a relatively thin continuous film to cause the formation about the outer edge of the film thus formed of a continuous supply of separated liquid particles, contacting the continuous film and the particles with a current of the gas traveling along lines generally parallel to the plane of the continuous liquid film, the film being exposed on both sides to contact with the gas current.

5. The method of mixing a liquid with a gas which includes directing a stream of liquid against an impact surface and causing it thereby to change direction and thereby a thin film of the liquid extending generally at right angles to the line of delivery of the liquid against said impact surface, maintaining said film undisturbed and unbroken throughout its area, discharging from about the outer edge of said film, finely divided particles of the liquid and maintaining over said film a flow of a gas to be treated, and directly contacting said particles with the gas prior to their contact with any solid surface.

6. The method of mixing a liquid and a gas which consists in causing the formation of a relatively thin, continuous film of liquid wherein the liquid travels outwardly along radial lines from a center of dispersion, causing the continuous discharge from substantially the entire periphery of such film of separated and finely divided liquid particles, the film being substantially unbroken and unsupported, and exposing the film edgewise to a current of gas.

7. The method of mixing a liquid and a gas which consists in causing the formation of a relatively thin continuous unsupported film of liquid, wherein the liquid travels outwardly along radial lines from a center of dispersion causing the continuous discharge from the outer edge of such film, of separated and finely divided liquid particles, and maintaining the film substantially undistorted by gas pressure while exposing it to the gas to be treated.

8. The method of mixing a liquid and a gas which consists in causing the formation of a relatively thin continuous unsupported film of liquid, wherein the liquid travels outwardly along radial lines from a center of dispersion, causing the continuous discharge from substantially the entire periphery of such film, of separated and finely divided liquid particles, and subjecting said particles to the gas to be treated in the course of their travel outwardly from the periphery of the film, and positioning the film of liquid in a zone of gas flow, directing the gas into said zone in a direction substantially perpendicular to the direction of emission of the liquid particles and causing its direction to change to substantial parallelism with the direction of emission of the fine particles from the liquid film.

9. The method of impregnating gas with liquid particles, consisting of forming an unsupported film of the liquid breaking at its edge into minute particles, and causing the gas to flow along both sides of the film and through said liquid particles.

10. The method of impregnating gas with liquid particles, consisting of forming an unsupported and unbroken substantially circular film of the liquid breaking at its edge into minute particles, and causing the gas to flow in a direction in substantial parallelism with the surface of the film and through said liquid particles.

In witness whereof, I hereunto subscribe my name this 9th day of April, A. D. 1932.

PAUL D. VANVLIET.